July 29, 1941.  W. A. ANDERSON  2,251,098
MOTOR CONTROL FOR BUSINESS MACHINES
Filed June 29, 1938  2 Sheets-Sheet 1
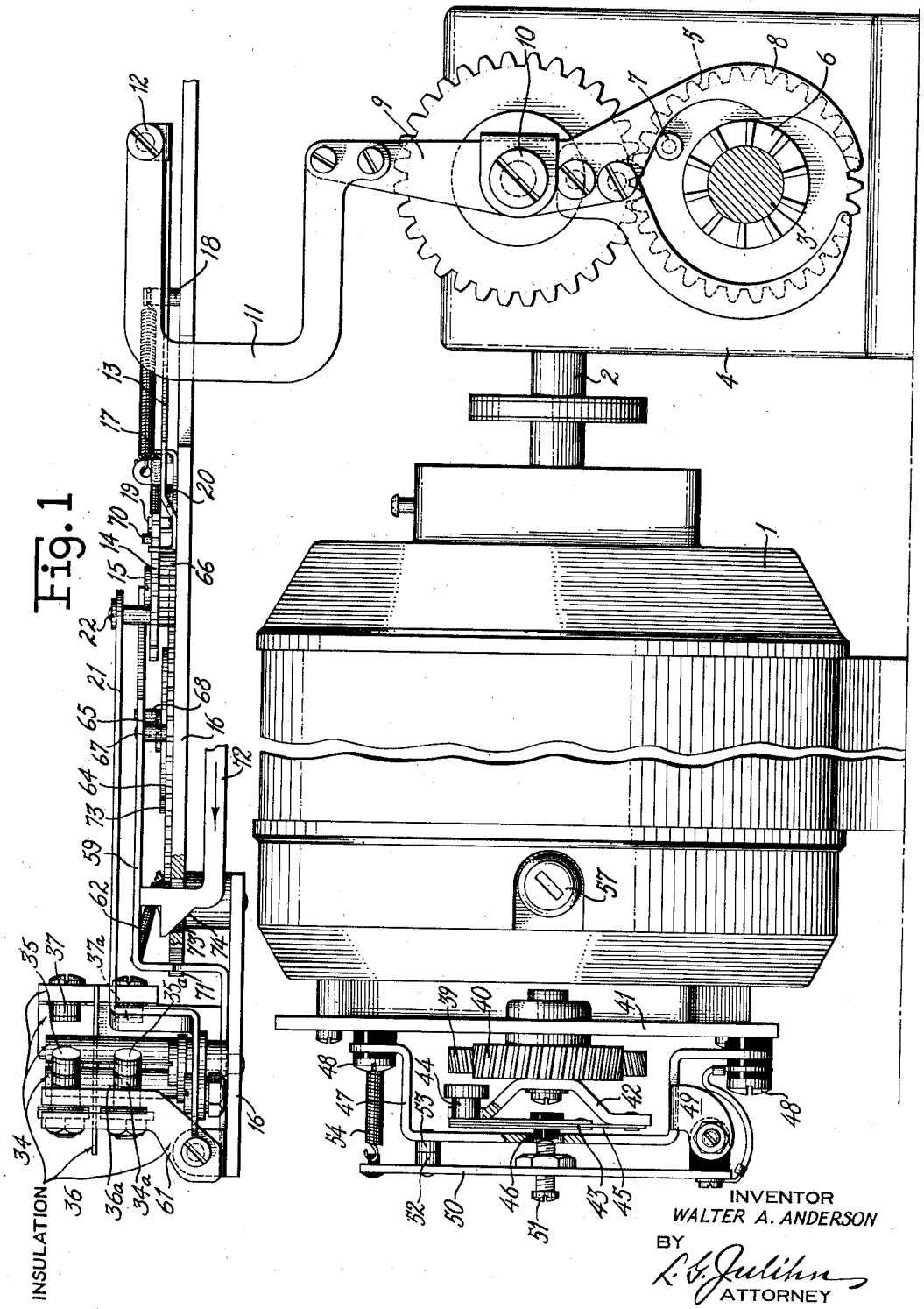
INVENTOR
WALTER A. ANDERSON
BY
*L. G. Julihn*
ATTORNEY July 29, 1941.  W. A. ANDERSON  2,251,098
MOTOR CONTROL FOR BUSINESS MACHINES
Filed June 29, 1938  2 Sheets-Sheet 2
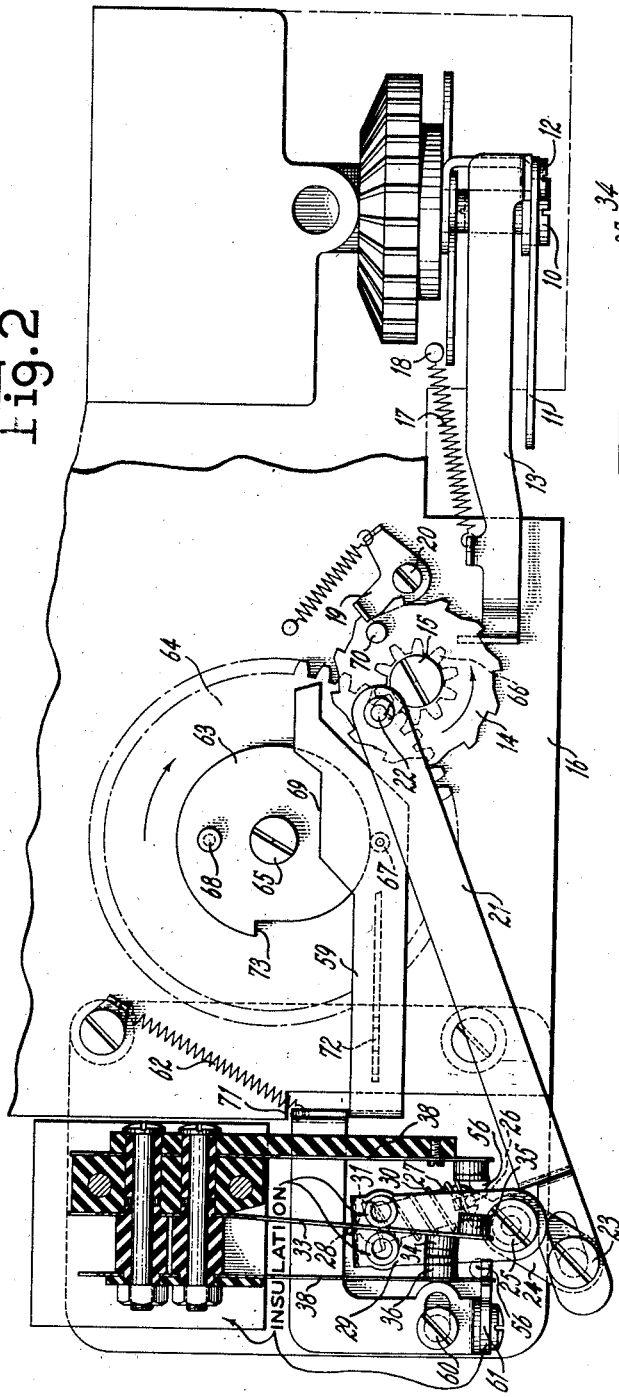
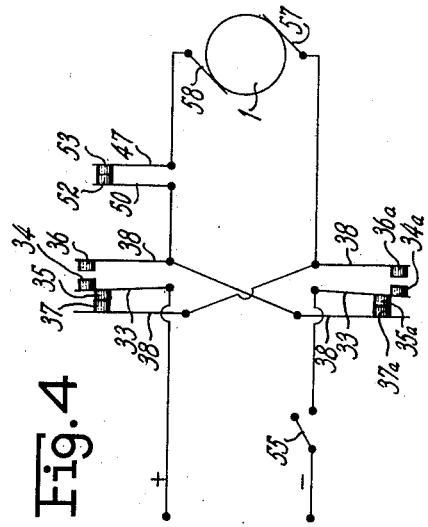
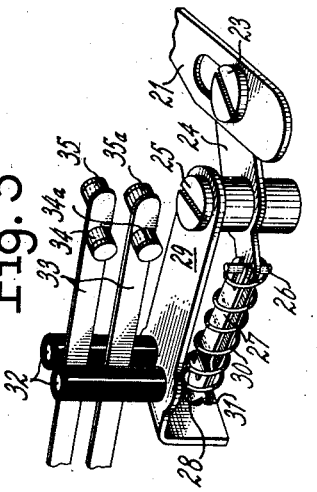
INVENTOR
WALTER A. ANDERSON
BY
ATTORNEY Patented July 29, 1941

2,251,098

UNITED STATES PATENT OFFICE 2,251,098

MOTOR CONTROL FOR BUSINESS MACHINES

Walter A. Anderson, Bridgeport, Conn., assignor to Underwood Elliott Fisher Company, New York, N. Y., a corporation of Delaware Application June 29, 1938, Serial No. 216,466

1 Claim. (Cl. 200—6)

This invention relates to electric motor driven accounting machines and more particularly to a means for reversing the direction of the flow of current through the contacts of the speed control governors on such machines.

Electric motor operated accounting machines may be equipped with a speed control device comprising a pair of electric contacts wired in series in the motor circuit and arranged for repeated opening and closing under the control of a centrifugal governor connected to the motor shaft, to keep the shaft rotating at a constant speed. In certain localities direct current only is available for operating these machines. It has been found that this type of current is unsuitable for efficient operation of the machine because of the arc created between the contacts incident to the repeated opening thereof. The flow of the current tends to transfer metal from one contact face to the other, and since direct current always flows in one direction, the metal builds up ragged projections upon one of the contact surfaces and pits in the opposite contact surface. This results in faulty operation.

It is, therefore, a purpose of the present invention to provide a means for periodically reversing the direction of flow of current through the contacts, to prevent the destructive action of the arc, whereby to insure efficient operation of the speed control device and obviate the necessity for frequent attention thereto.

With this and incidental objects in view, the invention consists in certain novel features of construction and combinations of parts, the essential elements of which are set forth in appended claim, and a preferred embodiment of which is hereinafter described with reference to the drawings which accompany and form part of the specification.

In the drawings:

Figure 1 is a left side elevation of the device illustrating its adaptation to an accounting machine, Figure 2 is a top plan view thereof, Figure 3 is a detailed perspective view of certain of the current direction reversing contacts and the toggle mechanism for shifting same, and Figure 4 is a wiring diagram illustrating the connections between the current direction reversing contacts, the speed control governor contacts and the motor.

General description

The invention is illustrated in connection with an accounting machine such as that disclosed in Patent No. 2,194,270, issued to Oscar J. Sundstrand on March 19, 1940.

General the invention comprehends the interposing in the motor circuit of what is substantially a double pole, double throw switch that is arranged to be automatically thrown back and forth between the opposite poles to periodically reverse the polarity of the current flow through the contacts of the speed governor.

Detailed description

Referring to Figure 1, the reference numeral 1 indicates an electric motor having its armature shaft 2 connected to a drive shaft 3 by reduction gearing contained in a housing 4. A gear 5 is fixed on shaft 3 for continuous rotation therewith and is provided with a clutch face 6 arranged to be engaged by a driven clutch face (not shown) for operating the machine, as described in the above mentioned patent.

An electric contact governor to control the speed of the motor is shown in Figure 1, and comprises a gear 39 secured to the left end of armature shaft 2 and meshing with a gear 40 journaled on a plate 41 secured to the motor housing. A bracket 42 of rigid construction is fixed to the center of gear 40 and has secured thereto at one end a flexible actuating feather 43. Feather 43 carries at its opposite end a weight 44 lying normally to the right of the plane of rotation of pivot point 45 of feather 43. Feather 43 is provided with a boss 46 of insulating material located at the axis of rotation of the feather. A rigid contact support 47 insulatedly supported on two screws 48 is provided with depending ears 49 between which is insulatedly pivoted a contact feather 50. Feather 50 carries a set screw 51 in axial alignment with boss 46, and carries a contact 52 to cooperate with an oppositely disposed contact 53 secured in support 47. A spring 54 connected to an insulating lug in feather 50 and at its opposite end to the machine frame, tensions contact 52 against contact 53. Suitable cables (not shown) are provided to carry the current through support 47, contacts 53 and 52 and feather 50, and from there to the electric motor, so that the motor is supplied with current only while contacts 52 and 53 are closed.

When current is started through these cables and through the motor, armature shaft 2 starts rotating, whereupon weight 44 moves to the left about the pivot 45. Its amount of movement to the left varies with the speed of rotation of shaft 2. As weight 44 and feather 43 move to the left, boss 46 exerts pressure against screw 51, and upon continued acceleration of armature shaft 2 causes feather 50 and contact 52 to move away from contact 53. This breaks the circuit to the motor 1, causing it to decelerate until weight 44 and the associated parts move a short distance to the right, at which time contact 52 again touches contact 53, reestablishing the circuit. When these parts find their equilibrium, contacts 52 and 53 are made and broken in such rapid succession that the motor runs at a speed that is sufficiently constant for practical purposes. As before stated, the arcing incident to the opening of contacts 52 and 53 causes a transferring of metal from one contact to the other, and when direct current is used, the continuous flow of the current in one direction causes the metal to always transfer in one direction, building up projections on one contact and making pits in the other. To overcome this difficulty, an automatically operated switch is arranged to periodically reverse the direction of flow of the current through contacts 52 and 53. This reversing alternates the transfer of the minute metal particles from one contact face to the other, keeping the surfaces smooth and regular to insure efficient operation. A description of this mechanism and its operation follows.

The continuously driven gear 5 (Figure 1) car- a pin 7 arranged to intermittently strike an arm 8 secured on a lever 9 pivoted on a stud 10 secured in the machine frame. The upper end of lever 9 carries an extension 11 pivoted at 12 to a pawl 13, the left end of which engages a ratchet wheel 14 rotatably mounted on a stud 15 secured in a supporting plate 16. A spring 17 connected between pawl 13 and a pin 18 fixed in plate 16 tensions the pawl toward the right and in turn tensions lever 9 and arm 8 clockwise about stud 10. As pin 7 strikes arm 8 during each revolution of gear 5, lever 9 and extension 11 swing counter-clockwise about stud 10 a distance sufficient to cause pawl 13 to advance one tooth on ratchet 14, and as the parts restore under tension of spring 17, a counter-clockwise movement of one tooth space is imparted to the ratchet. A spring tensioned dog 19 pivoted on a stud 20 engages the ratchet to prevent retrograde movement thereof.

A pitman 21 is pivoted at one end on a stud 22 secured in off-center relation on ratchet 14, and is connected by a screw and slot connection 23 (Figure 3) to a toggle lever 24 pivoted on a stud 25 secured in plate 16. The opposite end of lever 24 carries a vertically disposed pin 26 that engages a slotted end of a second toggle lever 27. The opposite end of lever 27 is pivoted in an aperture 28 provided in a downwardly turned flange of a bracket 29 pivoted on stud 25. A coil spring 30 encircles lever 27 and extends between pin 26 and laterally projecting lugs 31 formed on lever 27. Two upstanding insulated studs 32 fixed in spaced relation on bracket 29 lie on the opposite sides of a pair of center straps 33. Straps 33 are insulatedly mounted on plate 16, as shown in Figure 2, and carry at their forward ends oppositely disposed contact points 34, 34a, and 35, 35a (Figure 3), arranged to contact respectively, contact points 36, 36a, and 37, 37a (Figure 1), provided on the forward ends of outer straps 38 (Figure 2) likewise insulatedly mounted on plate 16 on the opposite sides of center straps 33. When toggle levers 24 and 27 are in the position shown in Figure 2, contact points 34 and 34a connect with contact points 36 and 36a.

As ratchet wheel 14 rotates counter-clockwise about stud 15, pitman 21 reaches a position where it pulls toward the right, rotating toggle lever 24 counter-clockwise about stud 25, swinging toggle lever 27 clockwise on pivot 28, and simultaneously compressing spring 30. As soon as this movement of toggle levers 24 and 27 is sufficient to move them past their dead center, spring 30 continues the movement of the toggle levers, and thrusts center straps 33 toward the right, as viewed in Figure 2. This movement opens contact points 34, 34a, and 35, 35a and closes contact points 35, 35a and 37, 37a. Continued rotation of ratchet wheel 14 brings pitman 21 around to a position where it pushes toward the left, taking up the lost motion between screw and slot connection 23 and reversing the action of the toggle connection. This returns the parts to the position shown in Figure 2. Upstanding pins 56 (Figure 2) fixed in plate 16 on opposite sides of lever 24 limit the movement of toggle levers 24 and 27.

Referring now to the wiring diagram (Figure 4), center straps 33 are connected directly to the positive and negative line terminals, a manually operated switch 55 being inserted in the negative line terminal. From strap 33 on the positive side the current goes to contact 35, to contact 37, strap 38, motor brush 57, through the motor, brush 57, support 47, contacts 53 and 52, contacts 37a, 35a, and then out through the negative line terminal.

When the toggle connection operates to shift the contacts, the current comes in the positive side of the line as before, but instead of going through contacts 35 and 37 to pass through the speed governor contacts from 53 to 52, it goes through contacts 34 and 36 to pass through the speed governor contacts from 52 to 53. It then passes through the motor, through contacts 36 and 34a and out through the negative line terminal.

Means is also provided for automatically opening the motor circuit after the lapse of a brief period, say one to two minutes following the last operation of the machine, so that in the event that the operator fails to open manual control switch 55, the motor will be automatically stopped. This means comprises a link 59 (Figure 2) mounted for sliding movement on plate 16 by means of a stud 60 extending through an elongated slot in the link and secured in plate 16. An upstanding arm 61 of insulating material is slotted, as shown in Figure 1, to receive the outer ends of the contact straps 38 which carry the contacts 36 and 36a. A spring 62, connected between link 59 and the machine frame, tensions the link toward the right, and also holds the link in position for movement by a cam 63 secured on the upper face of a gear 64 rotatably mounted on a stud 65 fixed in plate 16. Gear 64 meshes with a pinion 66 fixed on the under side of ratchet 14 for rotation therewith. A stud 67 is secured on the lower side of link 59 to bear against the periphery of cam 63. A pin 68 is secured on the upper side of the cam in position to engage an edge 69 of link 59 as the cam revolves. A pin 70 is secured on the ratchet wheel 14 and is in position to engage the right end of link 59 at a predetermined time.

The right end of link 59 is free to be lifted sufficiently to bring stud 67 above cam 63, to allow spring 62 to move the link against a shoulder 71 of plate 16, and place the stud 67 on top of the cam. The means for lifting link 59 comprises a slide 72 (Figure 1), the left end of which extends through an opening 73 in plate 16. This end of slide 72 underlies link 59 and is provided with a beveled surface 74 that bears against the left end of opening 73. The opposite end of the slide is connected to a lever (not shown) which is arranged to be controlled by various manipulative members used for engaging the clutch members and starting the machine. These parts are disclosed in the aforementioned Patent No. 2,194,270. Suffice it to say that when any of these manipulative elements are operated as described in said patent, slide 72 is pushed toward the left and then returned to normal position, raising link 59 to permit spring 62 to place the link against shoulder 71. The stud 67 then supports the link on top of the cam at such a height that pin 68 cannot engage the link. When rotation of gear 64 moves the cutaway portion 73 of cam 63 under stud 67, link 59 drops until stud 67 rests on gear 64, edge 69 then being in the path of pin 68. As cam 63 continues to revolve, pin 68 engages edge 69 of the link and swings the link into the path of pin 70. When pin 70 engages link 59, the latter is pushed rearwardly against the tension of spring 62 to move contacts 36 and 36a away from contacts 34 and 34a, and thereby open the motor circuit. Operation of any of the manipulative elements to start the machine moves slide 72 toward the left, as previously described, and thereby raises link 59 above the path of stud 70, permitting spring 62 to again move the link toward the right and bring contacts 36 and 36a into contact with contacts 34 and 34a to reestablish the circuit.

The above construction provides a reversing switch and a time switch having certain of their contacts in common, thereby reducing the cost of manufacture and maintenance.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claim which follows.

What is claimed is:

In a machine of the class described, a switch mechanism having two sets of outer contacts, movable center contacts cooperating with the outer contacts, means for shifting the center contacts between the sets of outer contacts, and means operated by a part of the shifting means for removing one of the sets of outer contacts from cooperation with the center contacts.

WALTER A. ANDERSON.